United States Patent [19]

Linguenheld

[11] 4,104,237
[45] Aug. 1, 1978

[54] ORGANOSILICON SUNLIGHT-RESISTANT PASTES

[75] Inventor: Louis Linguenheld, Saint Genis-Laval, France

[73] Assignee: Rhone-Poulenc Industries, Paris, France

[21] Appl. No.: 733,173

[22] Filed: Oct. 18, 1976

[30] Foreign Application Priority Data

Oct. 21, 1975 [FR] France .................. 75 32123

[51] Int. Cl.$^2$ ............................................ C08L 83/04
[52] U.S. Cl. .................. 260/37 SB; 252/28; 252/63.7; 260/45.8 NT; 428/447
[58] Field of Search ............ 106/287 SB; 260/37 SB, 260/45.8 NT; 428/447; 252/63.5, 63.7, 64, 28

[56] References Cited

U.S. PATENT DOCUMENTS

| | | |
|---|---|---|
| 2,428,608 | 10/1947 | Bass .................. 106/287 SB |
| 3,037,933 | 6/1962 | Wright .................. 252/28 |
| 3,103,491 | 9/1963 | Wright .................. 252/28 |
| 3,214,436 | 10/1965 | Boyle et al. .................. 260/45.8 NT |
| 3,882,033 | 5/1975 | Wright .................. 252/63.7 |
| 4,011,168 | 3/1977 | Uhlmann .................. 106/287 SB |

OTHER PUBLICATIONS

Noll; CHEMISTRY AND TECHNOLOGY OF SILICONES; Academic Press; 1968; pp. 426–428.

*Primary Examiner*—Lewis T. Jacobs
*Attorney, Agent, or Firm*—Bacon & Thomas

[57] ABSTRACT

Organosilicon pastes comprised of from about 5 to about 30 parts of inorganic fillers, and from about 0.1 to about 2.5 parts of ultraviolet radiation absorption effective organic compounds, per 100 parts by weight of oily diorganopolysiloxane polymers are disclosed, which pastes are particularly useful for the protection of electrical insulators.

12 Claims, No Drawings

ORGANOSILICON SUNLIGHT-RESISTANT PASTES

BACKGROUND OF THE INVENTION

1. Field of the Invention

The present invention relates generally to organosilicon pastes having improved resistance to sunlight, a process for the preparation thereof, and the use of such pastes for the protection of electrical insulators. More particularly, the present invention relates to organosilicon pastes having inorganic fillers and additions of ultraviolet radiation absorption effective organic compounds.

2. Description of the Prior Art

In the distribution of high voltage electric current, it has been observed that insulators for the high voltage lines commonly become covered with various foreign materials, predominantly thin coatings consisting of agglomerated dust. Such a coating, upon interaction with the ambient, frequently proves to be an electrical conductor due to absorption of water and the like. This often results in arcing and tracking of electric current which may frequently be fatal to the integrity of the distribution system.

It is known that these problems may be relieved, in part, by depositing thin layers of organosilicon pastes on the insulator. Subsequently, dust which then coats this surface will itself be coated by the paste substance through an exudation effect, with a concomitant diminution in the tendency for this dust or foreign material to become an electrical conductor. Significantly, however, the known organosilicon pastes have a propensity to transform into a rubbery or elastic mass upon exposure to sunlight. Initially, a skin is observed to form on these known pastes when exposed to sunlight followed, ultimately, by complete conversion of the mass to a rubbery material which tends to crack in this aged condition. Once this occurs, the paste no longer is efficacious for its desired application and deterioration of the insulators may then proceed as if the paste were not present.

Accordingly, the need exists to provide a paste for the coating of electrical insulators, particularly those used in connection with high voltage electric current, which do not suffer the significant deficiency of aging in the presence of sunlight or other sources of ultraviolet radiation. Likewise, the need exists to provide a method for simply, efficiently, and economically manufacturing such desirable products.

SUMMARY OF THE INVENTION

In accordance with the deficiencies of the prior art, it is a primary object of the present invention to provide a coating for electrical insulators, particularly high voltage insulators, which exhibit a prolonged ability to protect the insulator from deterioration resulting from arcing and tracking of current due to deposits of foreign material.

It is also a major object of the present invention to provide an improved organosilicon paste having superior resistance to sunlight or other ultraviolet radiation and which may be applied to electrical insulators to protect same.

Yet a further object of the present invention is to provide organosilicon pastes for coating electrical insulators, which pastes incorporate ultraviolet absorbing effective organic compounds.

Still a further object of the present invention is to provide a method for manufacturing organosilicon pastes of improved effectiveness in the prevention of the deterioration of electrical insulators.

Yet further objects of the present invention will become apparent to the skilled artisan upon examination of the detailed description of the invention and the preferred embodiments thereof.

In accordance with the present invention, it has now been determined that organosilicon pastes may be provided with enhanced and superior resistance to degradation from irradiation by sunlight or other sources of ultraviolet radiation, and which exhibit improved protection for electrical insulators by incorporating from about 5 to about 30 parts of selected organic fillers and from about 0.1 to about 2.5 parts of ultraviolet radiation absorption effective organic compounds per 100 parts by weight of oily diorganopolysiloxane polymers. The inorganic fillers are selected from the group consisting of pyrogenous silicas, silica aerogels and xerogels, precipitated silicas, diatomaceous silicas, ground quartz, clays, lamp-blacks, graphite, titanium oxide, aluminum oxide, zirconium oxide, zinc oxide, lithopone, and mixtures thereof. The ultraviolet radiation absorption effective organic compounds are selected from those known to absorb energy within the wave length range of 2,500 to 4,000 Angstroms; the most preferred being selected from the derivatives of benzophenone, acrylonitrile, arylazines, and benzotriazole. Various other additives to improve workability, ease of application, and the like may also be added.

DETAILED DESCRIPTION OF THE INVENTION

The present invention relates to coatings for electrical insulators, employed in conjunction with high voltage electric current, to prevent foreign materials deposited thereon from assuming an electrical conductor characteristic which might otherwise allow arcing and tracking of the electric current across the insulator. Specifically, the present invention embraces a class of compounds, with particular additives, useful to this end and which do not suffer the serious flaws of known coatings which render them useless for their intended purpose in a relatively short amount of time when exposed to sunlight or other sources of ultraviolet radiation. This is of considerable importance in the application of these compounds, as insulators employed in the distribution of high voltage electric current are commonly exposed to such sunlight or other sources of ultraviolet radiation.

In order to elucidate more fully upon the objects, advantages, and applications of the present invention, the following detailed description will be given in terms of certain preferred embodiments and exemplified with respect thereto. However, this is intended as illustrative and in no wise limitative.

The present invention is predicated, in simplest terms, on organosilicon pastes which incorporate certain inorganic fillers and ultraviolet radiation absorption effective organic compounds. These pastes may then be applied in thin layers to the surface of insulators employed in conjunction with high voltage electric current and, because these pastes exhibit a greater resistance to degradation in the environments typically obtaining in such applications, vastly superior longevity is imparted to the insulators.

The base constituent of the paste of the present invention are oily diorganopolysiloxane polymers corresponding to the general formula:

$$R_3Si(OSiR_2)_nOSiR_3$$

where R represents hydrocarbon radicals, which may be the same or different, and which do not contain aliphatic unsaturation and which have a maximum of 10 carbon atoms; and, where n has a value in the range of from 30 to 1,500. More specifically, the hydrocarbon radicals represented by R may be chosen from the group consisting of alkyl radicals having from 1 to 8 carbon atoms (such as methyl, ethyl, propyl, butyl, pentyl, hexyl, and 2-ethylhexyl radicals), and the aromatic radicals having a single benzene nucleus and having from 6 to 10 carbon atoms (such as the phenyl, tolyl, xylyl, ethylphenyl, cumenyl, and butylphenyl radicals).

Thus, these linear diorganopolysiloxane polymers consist essentially, exclusive of the terminal units, of a succession of units of the formula $R_2SiO$. However, the presence of a small amount of other units, on the order of less than about 1 percent relative to the number of $R_2SiO_2$ units, such as those of the formula $SiO_2$ and $RSiO_{1.5}$ are permissible.

It has been determined that, for each molecule of these diorganopolysiloxane polymers, at least 45 percent of all the hydrocarbon radicals represented by R should be methyl radicals. This insures a diorganopolysiloxane polymer which is an oily liquid exhibiting a viscosity within the range of from about 50 centistokes (cSt) to about 500,000 centistokes at 25° C, dependent upon the nature of the radicals R and the values of n. The skilled artisan will recognize that these oily diorganopolysiloxane polymers are readily available from those who commercially manufacture silicones. Also, methods for their manufacture may be found in the chemical literature; see, for example, French Pat. Nos. 978,058; 1,025,150, and 1,108,964.

Further by way of illustration, various polymers found suitable and which are embraced within the foregoing formulation, include:

$$(CH_3)_3SiO[Si(CH_3)_2O]_{n_1}Si(CH_3)_3$$

$n_1 = 50$ to $1,500$ $$(CH_3)_3SiO[Si(CH_3)_2O]_{n_2}[Si(C_2H_5)(CH_3)O]_{n'_2}Si(CH_3)_3$$

$n_2 = 30$ to $1,000$
$n'_2 = 10$ to $200$ $$(CH_3)_3SiO[Si(CH_3)_2O]_{n_3}[Si(nC_3H_7)(CH_3)O]_{n'_3}Si(CH_3)_3$$

$n_3 = 25$ to $800$
$n'_3 = 10$ to $150$ $$(CH_3)_3SiO[Si(CH_3)_2O]_{n_4}[Si(C_6H_5)(CH_3)O]_{n'_4}Si(CH_3)_3$$

$n_4 = 25$ to $600$
$n'_4 = 5$ to $130$ $$(CH_3)_3SiO[Si(CH_3)_2O]_{n_5}[Si(C_6H_5)_2O]_{n'_5}Si(CH_3)_3$$

$n_5 = 25$ to $600$ $n'_5 = 5$ to $100$

The values of $n_i$ and $n'_i$ ($i = 1$ to 5) vary within the range set forth above in such a manner as to insure that the number of methyl radicals in each molecule of the polymer account for at least 45 percent of all the radicals linked to the silicon atoms of these polymers. As noted, such a requirement is necessary to insure the proper viscosity range for the pastes of the present invention.

In addition to the oily diorganopolysiloxane polymers, the pastes of the present invention incorporate certain inorganic fillers. These fillers are preferably selected from the group consisting of pyrogenous silicas, silica aerogels and xerogels, precipitated silicas, diatomaceous silicas, ground quartz, clays, lamp-blacks, graphite, titanium oxide, aluminum oxide, zirconium oxide, zinc oxide, and lithopone. However, other functionally effective fillers may be employed.

The preferred inorganic fillers, for purposes of the present invention, are the finely divided silicas which exhibit a mean particle diameter of less than about 0.1 microns and which have specific surface areas generally greater than 50 m²/g, and which may exceed 300 m²/g.

The inorganic fillers for the paste may be surface modified, particularly in the case of the finely divided fillers, by treatment with various organosilicon compounds standard in the art for this purpose. For example, of the organosilicon compounds useful for surface modification, diorganocyclopolysiloxanes and hexaorganodisiloxanes (such as those disclosed in French Pat. Nos. 1,136,884; 1,136,885, and 1,236,505, and diorganocyclopolysilazanes and hexaorganodisilazanes (such as disclosed in British Pat. No. 1,024,234), have been found particularly useful. The amounts of these organosilicon compounds fixed to the fillers may vary; however, it has been found that their presence should be restricted within the range of from about 3 to about 30 percent by weight of the fillers.

The inorganic fillers, described above, and which may or may not be modified by treatment with the organosilicon compounds, are added to the diorganopolysiloxane polymers within the range of from about 5 to about 30 parts per 100 parts of these polymers. Preferably, the fillers are added within the range of from about 8 to about 25 parts per 100 parts of polymers.

The other major component of the pastes of the present invention is an organic compound effective for the absorption of ultraviolet radiation; that is, organic compounds capable of absorbing radiation in the ultraviolet portion of the spectrum which ranges from about 2,500 to about 4,000 Angstroms. Various compounds are known to exhibit this property; however, the compound must obviously be compatible with the other components of the paste. Accordingly, it has been determined that those most efficacious for this purpose are the derivatives of benzophenone, acrylonitrile, arylazines and benzotriazole. The most preferred of the ultraviolet absorbing compounds are the benzotriazole derivatives corresponding to the general formula:

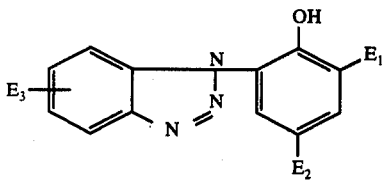

wherein $E_1$ represents a hydrogen atom, a methyl radical, an isopropyl radical, or a tertiary butyl radical; $E_2$ represents a methyl radical or a tertiary butyl radical; and, $E_3$ represents a hydrogen atom or a chlorine atom.

Exemplary of those benzotriazole derivatives most preferred for use in the paste of the present invention are those having the following formulae:

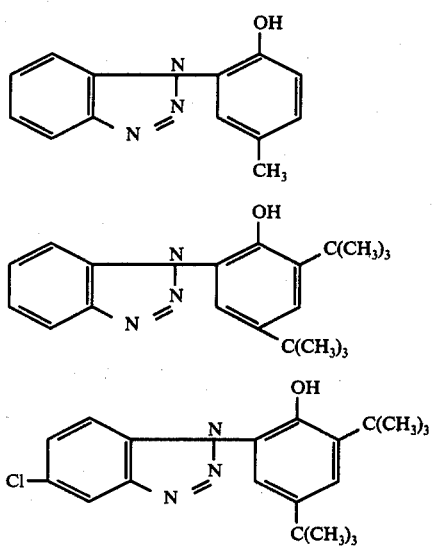

The organic compounds for absorption of ultraviolet radiation are incorporated into the paste of the present invention within the range of from about 0.1 to about 2.5 parts per 100 parts of diorganopolysiloxane polymers. Preferably, these organic compounds are added within the range of from about 0.2 to 2 parts per 100 parts of polymer.

In order to facilitate the dispersion of these ultraviolet radiation absorption effective organic compounds into the mass of the paste, it is found advantageous to employ these compounds in the form of a solution in an organic solvent therefor. Among those useful solvents are halogenated or non-halogenated aromatic hydrocarbons such as toluene, xylene, cumene, and chlorobenzene. Also useful as solvents are the halogenated aliphatic hydrocarbons such as chloroform, dichloroethane, trichloroethylene, and perchloroethylene. The solution of the ultraviolet absorption organic compound should contain from about 3 to about 30 percent by weight of the organic compounds based upon the solvent content.

Other useful additives may be employed in the paste of the present invention. For example, additives may be used which facilitate the preparation of the paste, such as by improving the dispersion of the fillers or reducing the period of mixing, and/or to improve the internal cohesion of the paste. For example, additives such as polyalkylene glycols, boric acid and alkyl borates, pentaerythritol, and hydroxylic diorganopolysiloxane oils of fairly low viscosity (ranging from 10 to 500 cPo at 25° C) may be employed. However, the total amount of such additives must be restricted to less than 6 parts per 100 parts of the diorganopolysiloxane polymers of the paste.

A particularly beneficial additive to improve the integrity of the paste against the action of the meterological phenomena are the polyalkylene glycols. These polyethers prevent the pastes, which are deposited in thin layers on the insulator, from being removed by the mechanical action of such natural elements as wind, rain, hail, etc.

The preferred polyalkylene glycols correspond to the average general formula:

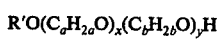

wherein $R'$ represents a hydrogen atom or an alkyl radical having from 1 to 7 carbon atoms; $a$ and $b$ represent integers ranging from 1 to 4; $x$ represents any positive number ranging from 4 to 50; and, $y$ is a positive number ranging from 0 to 50. These compounds are commercially available or can readily be produced by reacting alkylene oxides (such as ethylene, propylene, or butylene oxides) with compounds of the formula $R'OH$, where $R'$ is identical with that recited above in connection with the polyalkylene glycols. When incorporating these polyalkylene glycols in the paste of the present invention, their presence should be generally restricted to no more than about 3 parts per 100 parts of diorganopolysiloxane polymer.

The pastes of the present invention may be prepared with the aid of known apparatus designed for mixing mixtures comprised of solid compounds with oily or rubbery compounds. Thus, mixers (malaxators), roll mills, and kneaders are admirably suitable for preparation of the pastes of the present invention.

In mixing the various components of the paste, the order of incorporation thereof is not vital but, as a practical matter, it is found best to first introduce those ingredients which are easiest to disperse; that is, the oily diorganopolysiloxane polymers, any additives, and the ultraviolet radiation absorption effective organic compounds. The inorganic fillers of the paste are best added last. Additionally, the inorganic fillers are advantageously added in small proportions, particularly the finely divided fillers having a mean diameter of less than 1 micron, to accelerate their dispersion while avoiding agglomeration within the mixing device.

The homogeneity of these pastes may be improved after mixing by passing the paste through appropriate grinders such as, for example, triple-roll mills wherein the clamping pressures between the first and second roll and between the second and third roll are adjusted to yield the desired degree of fineness. The pastes thus obtained exhibit a non-worked penetration value (calculated according to ASTM Standard Specification D 217-52 T) substantially in the range of from about 170 to about 230. The worked penetration value (also calculated in accordance with ASTM D 217-52 T) is found to be essentially within the range of from about 200 to about 260.

Pastes prepared in accordance with the present invention have been observed to withstand intense and prolonged exposure to sunlight or other sources of ultraviolet radiation for periods of at least 1 year without exhibiting the degradation attendant prior art pastes employed for these applications. Particularly, these pastes have been applied in thin layers (on the order of 1 to 4 mm) to the surface of insulators, terminals, and insulating pillars and have not exhibited any significant surface hardening for periods of up to at least 1 year. The pastes may be deposited on these surfaces by any conventional technique such as by spraying, by tamping, or by brush. In spraying the pastes of the present invention it has been found beneficial to disperse the paste in an organic solvent, such as halogenated hydrocarbons or petroleum cuts consisting principally of saturated aliphatic hydrocarbons. Such dispersions may contain varying amounts of paste, but it is desirable that the paste be present in a range of from about 30 to about 80 percent by weight.

In order to demonstrate the superior properties of the pastes of the present invention, the following comparative examples will be given as illustrative, and not limitative.

EXAMPLE I 900 g. of an α-ω-bis-(trimethylsiloxy)-dimethyl-polysiloxane oil having a viscosity of 10,000 cSt at 25° C, 9 g. of a monobutyl ether of a poly-(ethylene-propylene)glycol of an approximate viscosity of 248 cSt at 37° C, and 30 g. of a 15 percent strength solution, in trichloroethylene, of a benzotriazole derivative of the formula:

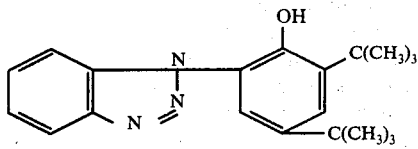

are introduced into a 2 liter mixer. The arms of the mixer are set in motion and, subsequently, 90 g. of a pyrogenous silica having a specific surface area of 200 m²/g is added in proportions of 18 g. to the contents of the mixer.

This mixture is kneaded for 7 hours to yield a paste which is then finely ground by passing it through a hydraulically clamped triple-roll mill. Each roll in the mill has a diameter of 8 mm and the clamping pressures are 10 and 20 kg/cm².

After these treatments, the paste exhibits a non-worked penetration value of 200 and a worked penetration value of 220. These penetration data are obtained in accordance with ASTM D 217–52 T.

100 g. of this paste is divided into 10 equal portions of 10 g. each. Each portion is spread in an aluminum dish having a diameter of 4 cm and a height of 1 cm, and the dishes placed in a heated oven maintained at 75° C. The oven is fitted with a 150 watt mercury vapor lamp positioned about 5 cm above the dishes. The paste samples are maintained in this environment of ultraviolet radiation at 75° C. After exposure for 2 months, no hardening, even on the surface of the samples spread in the dishes, is observed.

EXAMPLE II

A paste similar to that described in Example I is prepared but without addition of the 30 g. of the 15 percent strength solution of the benzotriazole derivative. This paste is treated in exactly the same fashion and 10 g. samples spread in identical aluminum dishes. These samples are likewise placed in an oven fitted with a lamp identical to that described above and maintained at the same temperature.

After 5 days exposure in this environment a rubbery skin on the surface of the paste is observed. After 10 days exposure the contents of the dishes is noted to be converted to a semi-elastic mass.

Similar results obtained when the inorganic additive is present in the paste.

Accordingly, it is quite apparent that the paste of the present invention is superior to those pastes conventionally employed to prevent the deterioration of electrical insulators due to deposits of foreign materials thereon which have a tendency to cause arcing and tracking on the insulator.

While the invention has now been described in terms of certain preferred embodiments and exemplified by way of comparative data, the skilled artisan will appreciate that various modifications, substitutions, omissions, and additions, may be made without departing from the spirit thereof. Accordingly, it is intended that the scope of the present invention be limited solely by that of the following claims.

What is claimed is:

1. An organosilicon paste comprising:
   (a) an oily diorganopolysiloxane polymer;
   (b) an inorganic filler; and,
   (c) an ultraviolet radiation absorbing effective organic compound, wherein said inorganic filler is present in the range of from about 5 to about 30 parts per 100 parts of said polymer.

2. The organosilicon paste of claim 1, wherein said ultraviolet radiation absorbing effective organic compound is present within the range of from about 0.1 to about 2.5 parts per 100 parts of said polymer.

3. The organosilicon paste of claim 2, wherein said inorganic filler is present within the range of from about 8 to about 25 parts per 100 parts of said polymer and said organic compound is present within the range of from about 0.2 to about 2.0 parts per 100 parts of said polymer.

4. The organosilicon paste of claim 2, further comprising a functionally effective dispersion agent for said inorganic filler present within the range of up to about 6 parts per 100 parts of said polymer.

5. The organosilicon paste of claim 2, wherein said organic compound is selected from the group consisting of the organic derivatives of benzotriazole, benzophenone, acrylonitrile, and arylazines.

6. The organosilicon paste of claim 5, wherein said organic compound is a benzotriazole derivative of the formula:

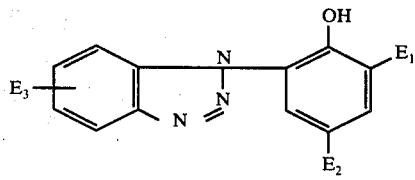

wherein $E_1$ is a hydrogen atom, a methyl radical, an isopropyl radical, or a tertiary butyl radical; $E_2$ is a methyl radical or a tertiary butyl radical; and $E_3$ is a hydrogen atom or a chlorine atom.

7. The organosilicon paste of claim 5, wherein said inorganic filler is selected from the group consisting of pyrogenous silicas, silica aerogels and xerogels, precipitated silicas, diatomaceous silicas, ground quartz, clays, lamp-blacks, graphite, titanium oxide, aluminum oxide, zirconium oxide, zinc oxide, lithopone, and mixtures thereof.

8. The organosilicon paste of claim 7, wherein said dispersion agents are selected from the group consisting of polyalkylene glycols, boric acid, alkyl borates, pentaerythritol, and hydroxylic diorganosiloxane oils of a viscosity within the range of from about 10 to about 500 cPo at 25° C.

9. The organosilicon paste of claim 6, wherein said inorganic filler is finely divided silica having a mean particle diameter of less than 0.1 micron and a surface area of at least about 50 m$^2$/g, and wherein said dispersion agent is a polyalkylene glycol having the general formula:

$$R'O(C_aH_{2a}O)_x(C_bH_{2b}O)_yH$$

where R' is a hydrogen atom or an alkyl radical having from 1 to 7 carbon atoms; $a$ and $b$ are integers ranging from 1 to 4; $x$ is a number in the range of from 4 to 50; and $y$ is a number from 0 to 50.

10. The process for preparing the organosilicon paste of claim 1, comprising the steps of:
 (a) adding an oily diorganosiloxane polymer, an inorganic filler, and an ultraviolet radiation absorbing effective organic polymer to a mixing apparatus; and,
 (b) mixing the mixture of (a) at ambient.

11. The method of improving the useful life of an electrical insulator comprising the step of applying the organosilicon paste defined in claim 2 to the surface of said insulator.

12. In an electrical insulator, the improvement comprising a coating of the organosilicon paste of claim 1.

* * * * *